(12) United States Patent
Kochar et al.

(10) Patent No.: US 11,720,449 B2
(45) Date of Patent: *Aug. 8, 2023

(54) REAL TIME DATABASE BACKUP STATUS INDICATION AND RESTORE

(71) Applicant: Rubrik, Inc., Palo Alto, CA (US)

(72) Inventors: Deepti Kochar, San Francisco, CA (US); Snehal Arvind Khandkar, Palo Alto, CA (US); Kevin Rui Luo, Fremont, CA (US); Yanzhe Wang, Palo Alto, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/517,895

(22) Filed: Nov. 3, 2021

(65) Prior Publication Data

US 2022/0058093 A1 Feb. 24, 2022

Related U.S. Application Data

(63) Continuation of application No. 15/931,291, filed on May 13, 2020, now Pat. No. 11,216,344.

(51) Int. Cl.
*G06F 11/14* (2006.01)
*G06F 11/07* (2006.01)
*G06F 3/0482* (2013.01)

(52) U.S. Cl.
CPC ........ *G06F 11/1466* (2013.01); *G06F 3/0482* (2013.01); *G06F 11/079* (2013.01); *G06F 11/1461* (2013.01); *G06F 11/1469* (2013.01); *G06F 11/1471* (2013.01); *G06F 2201/80* (2013.01); *G06F 2201/835* (2013.01)

(58) Field of Classification Search
CPC .... G06F 11/1466; G06F 3/0482; G06F 1/079; G06F 11/1461; G06F 11/1469; G06F 11/1471

See application file for complete search history.

(56) References Cited

U.S. PATENT DOCUMENTS 6,324,548 B1 11/2001 Sorenson
7,620,785 B1 11/2009 Coulter et al.
(Continued)

FOREIGN PATENT DOCUMENTS

WO 2019070915 4/2019

OTHER PUBLICATIONS

"International Application Serial No. PCT US2018 054256, International Search Report dated Dec. 4, 2018", 3 pgs.

(Continued)

*Primary Examiner* — Tammara R Peyton
(74) *Attorney, Agent, or Firm* — Holland & Hart LLP

(57) ABSTRACT

A computer-implemented method at a data management system comprises; retrieving start and end times of a backup of a database; retrieving time stamps of log backups of the database; retrieving sequence numbers of the log backups; generating a graphical user interface illustrating a timeline of availability of database restoration and unavailability; making a second backup of the database; illustrating, on the graphical user interface during the making, pending availability of the second database backup; receiving a command to restore the database at an available time as illustrated by the graphical user interface; and restoring the database.

20 Claims, 7 Drawing Sheets

(56) References Cited

U.S. PATENT DOCUMENTS

| | | | |
|---|---|---|---|
| 8,478,726 | B2 | 7/2013 | Habermann et al. |
| 9,558,072 | B1 | 1/2017 | Mam |
| 9,563,655 | B2 | 2/2017 | Chen et al. |
| 10,049,020 | B2 | 8/2018 | French et al. |
| 10,713,124 | B2 | 7/2020 | Luo et al. |
| 11,216,344 | B2 | 1/2022 | Kochar et al. |
| 11,416,344 | B2 * | 8/2022 | Zhou ................... G06F 11/1471 |
| 2005/0120064 | A1 | 6/2005 | Sinha et al. |
| 2007/0185922 | A1 | 8/2007 | Kapoor et al. |
| 2007/0294495 | A1 | 12/2007 | Uchida et al. |
| 2008/0270838 | A1 | 10/2008 | Dorai et al. |
| 2010/0017573 | A1 | 1/2010 | Shinozaki et al. |
| 2011/0161295 | A1 | 6/2011 | Ngo |
| 2011/0258164 | A1 | 10/2011 | Mandagere et al. |
| 2012/0110287 | A1 | 5/2012 | Han et al. |
| 2014/0115232 | A1 | 4/2014 | Goss et al. |
| 2015/0261623 | A1 | 9/2015 | Ho et al. |
| 2016/0110268 | A1 | 4/2016 | Sekiguchi et al. |
| 2016/0117228 | A1 | 4/2016 | Farlee et al. |
| 2016/0306709 | A1 | 10/2016 | Shaull |
| 2017/0075764 | A1 | 3/2017 | Banister |
| 2017/0230177 | A1 | 8/2017 | Barbas et al. |
| 2018/0137016 | A1 | 5/2018 | Brown et al. |
| 2018/0373604 | A1 | 12/2018 | Martin et al. |
| 2019/0073372 | A1 | 3/2019 | Venkatesan et al. |
| 2019/0102257 | A1 | 4/2019 | Zhou et al. |
| 2019/0155699 | A1 | 5/2019 | Luo et al. |
| 2021/0117293 | A1 | 4/2021 | Luo et al. |
| 2021/0224166 | A1 | 7/2021 | Luo et al. |
| 2021/0357297 | A1 | 11/2021 | Kochar et al. |
| 2022/0327026 | A1 | 10/2022 | Zhou et al. |

OTHER PUBLICATIONS

"International Application Serial No. PCT US2018 054256, Written Opinion dated Dec. 4, 2018", 4 pgs.

"U.S. Appl. No. 15/819,373, Non Final Office Action dated Nov. 27, 2019", 27 pgs.

"U.S. Appl. No. 15/819,373, Response filed Feb. 19, 2020 to Non Final Office Action dated Nov. 27, 2019", 14 pgs.

"U.S. Appl. No. 15/819,373, Notice of Allowance dated Mar. 5, 2020", 8 pgs.

"U.S. Appl. No. 16/151,263, Non Final Office Action dated Apr. 23, 2020", 23 pgs.

"European Application Serial No. 18864993.3, Extended European Search Report dated Oct. 23, 2020", 8 pgs.

"U.S. Appl. No. 16/151,263, Response filed Oct. 21, 2020 to Non Final Office Action dated Apr. 23, 2020", 13 pgs.

"U.S. Appl. No. 16/151,263, Final Office Action dated Dec. 2, 2020", 23 pgs.

"U.S. Appl. No. 16/151,263, Response filed Mar. 1, 2021 to Final Office Action dated Dec. 2, 2020", 11 pgs.

"U.S. Appl. No. 16/151,263, Advisory Action dated Mar. 10, 2021", 3 pgs.

"U.S. Appl. No. 17/143,081, Preliminary Amendment filed Apr. 12, 2021", 9 pgs.

"U.S. Appl. No. 15/931,291, Non Final Office Action dated Apr. 15, 2021", 8 pages.

"U.S. Appl. No. 15/931,291, Response filed Jul. 7, 2021 to Non Final Office Action dated Apr. 15, 2021", 9 pages.

"U.S. Appl. No. 15/931,291, Notice of Allowance dated Aug. 4, 2021", 7 pages.

"U.S. Appl. No. 16/151,263, Non Final Office Action dated Aug. 10, 2021", 23 pgs.

"U.S. Appl. No. 16/151,263, Examiner Interview Summary dated Nov. 4, 2021", 2 pgs.

"U.S. Appl. No. 16/151,263, Response filed Nov. 8, 2021 to Non Final Office Action dated Aug. 10, 2021", 10 pgs.

"U.S. Appl. No. 15/931,291, Corrected Notice of Allowability dated Dec. 1, 2021", 2 pgs.

Osuna, A, "Introduction to SnapManager for Virtual Infrastructure", SnapManager 2.0 for Virtual Infrastructure Best Practices, (2010), 6 pages.

Rubrik, "Rubrik Announces Andes 5.0 Release", (Nov. 14, 2018), 7 pages.

Rubrik, "Rubrik Andes 5.0", (Nov. 12, 2018), 2 pages.

Rubrik, "Game-Changing Innovation for Oracle Data Management", (Nov. 12, 2018), 4 pages.

U.S. Appl. No. 62/567,499, filed Oct. 3, 2017, Expired.

U.S. Appl. No. 16/151,263, filed Oct. 3, 2018, Patented, U.S. Pat. No. 11,416,344 B.

U.S. Appl. No. 17/849,939, filed Jun. 27, 2022, Pending.

PCT/US2018/054256, Oct. 3, 2018, Published, WO 2019/070915 A1.

EP 18864993.3, Oct. 3, 2018, Withdrawn.

U.S. Appl. No. 15/819,373, filed Nov. 21, 2017, Patented, U.S. Pat. No. 10,713,124 B2.

U.S. Appl. No. 16/890,542, filed Jun. 2, 2020, Pending.

U.S. Appl. No. 17/143,081, filed Jan. 6, 2021, Pending.

U.S. Appl. No. 15/931,291, filed May 13, 2020, Patented, U.S. Pat. No. 11,216,344 B2.

* cited by examiner

REAL TIME DATABASE BACKUP STATUS INDICATION AND RESTORE

CLAIM OF PRIORITY

This Application is a Continuation of U.S. application Ser. No. 15/931,291, filed May 13, 2020, which is hereby incorporated by reference in its entirety.

TECHNICAL FIELD

The present disclosure generally relates to databases and more particularly, but not exclusively, to providing real time database status indication and database restore functions.

BACKGROUND

Database backups can be created periodically to protect the information stored in the databases. If a database crashes, corrupts, or is lost, the backups can be used to restore the database to an earlier state. For instance, if a database crashes at 4:55 pm, the database can be restored by loading the last backup created at 4 pm. This approach does not restore the database to its latest state before the error. Continuing with the previous example, the changes between 4 pm and 4:55 pm are lost. Furthermore, the restoration process is a computing-resource intensive task. A transfer of backups typically consumes a lot of network bandwidth because backups include a large amount of data. In addition, loading a backup into a database consumes a lot of processing resources. During the recovery, the database may not even be accessible, which may lead to reduced productivity for functions that rely on such accesses.

BRIEF DESCRIPTION OF THE DRAWINGS

To more easily identify the discussion of any particular element or act, the most significant digit or digits in a reference number refer to the figure ("FIG.") number in which that element or act is first introduced.

DETAILED DESCRIPTION

Figure 1:
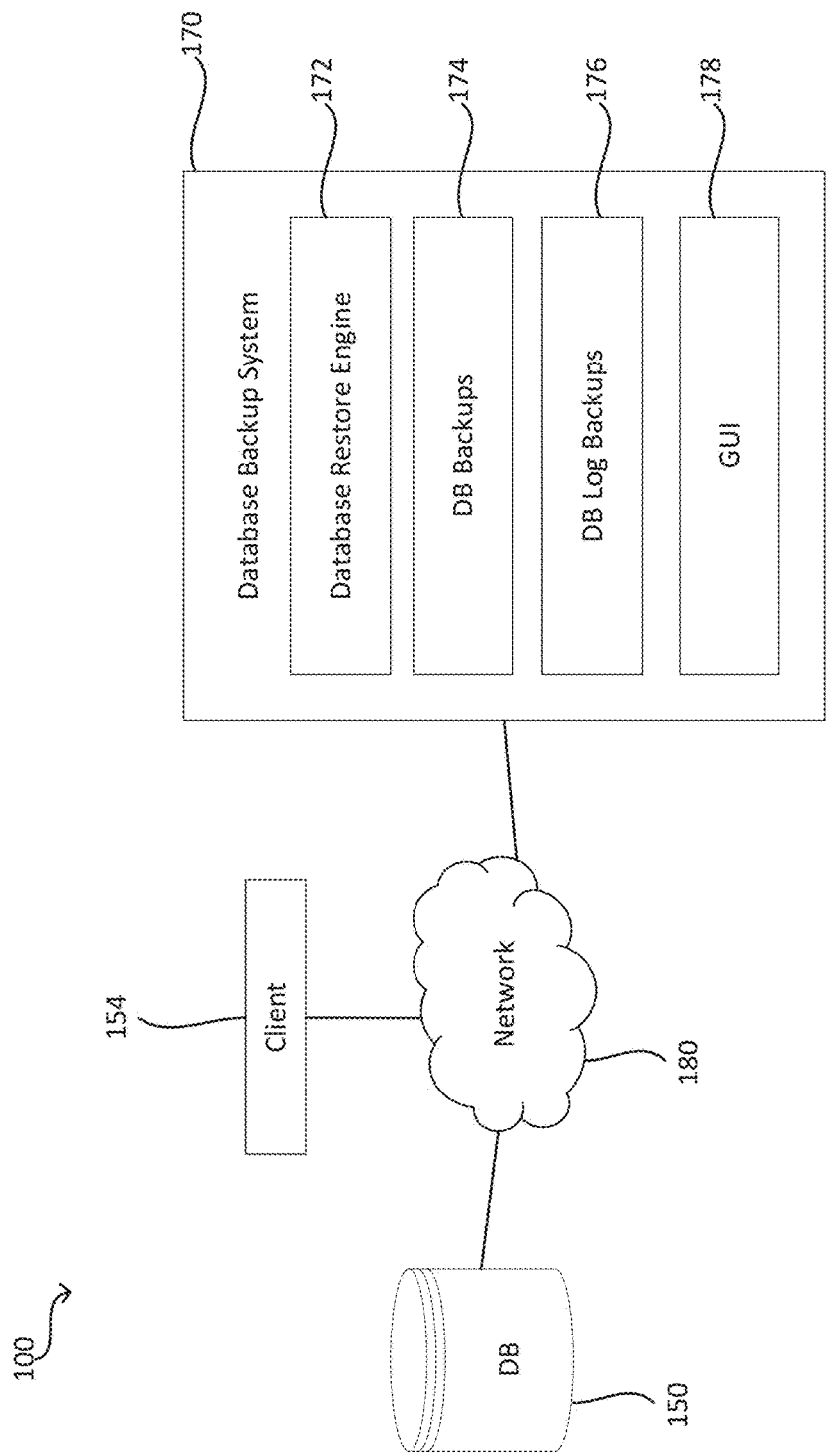
FIG. 1 depicts a networked computing environment in which the disclosed technology may be practiced, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments provide a visual graphical user interface (GUI) based view of the valid recoverable ranges for a database, such as an ORACLE database. It enables the database administrator to visually validate whether their backup and Recovery Point Objectives (RPO) Service Level Agreements (SLAs) are being met.

Databases are commonly used in business-critical applications. Databases have online redo logs which contain records of all database transactions. Once the redo log is full, it gets archived to an offline destination and is called an archived log. Databases have two types of backups: database backups and log backups. Database backups contain images of the data files. Log backups contain the archived logs. Database backups happen less frequently, such as once a day, and they are not consistent. Archived logs are needed to restore a database backup by bringing all the datafiles to a consistent point.

Log backups happen more frequently, such as every 30 minutes, and they are used for point in time restore of the database to any time between two database backups. Embodiments stitch together database backups and log backups and provide a timeline view, which lets the user see to which time ranges they can restore the database. It also allows users to select any recoverable time and perform an automated or manual restore to it. A benefit is the ease of use for users derived from having a visual representation of recoverability.

After each database backup, embodiments query the database to find the start and end time of the backup and store this information. The database backup can be restored to the end time of the backup. After each log backup, embodiments query the v$archived_log view in the database to find out information about each log file it received in this backup. Each log file has a FIRST_TIME (Timestamp of the first change recorded in this log), NEXT_TIME (Timestamp of the next change which corresponds to first change in the next log), and SEQUENCE # (a continuously incrementing number). It stores this information with the log snapshot. This information is used for multiple purposes. One purpose is to determine whether the database backups taken by the system are recoverable. Embodiments check whether the system has logs covering the duration of the database backup. If the system does, then the database backup is recoverable. It also uses this information to create or extend a recoverable chain for this database.

The recoverable chain starts with a database backup; it needs at least one database backup, but it can contain many. The first chain is created when system takes a log backup, which makes the database backup recoverable (i.e., the first and next times of the logs cover the database backup). The next log backup needs to decide whether to extend the current chain or break it and possibly start a new chain. If the sequence numbers for each database instance are continuous from the last backup, the chain is extended. If there are any missing sequence numbers between the highest sequence number of the last log backup and the lowest sequence number of the current one, the chain is broken. If the current backup has any intermediate sequence numbers missing, the chain is broken. The chain is also broken if the resetlogs ID has changed (i.e., the user restored the database and performed an open resetlogs operation). The start time of a recoverable chain is the end time of the first database backup. The end time of a recoverable chain is the latest next time of the last log backup in the chain. When a chain is broken, a new database backup and subsequent log backup are needed to start a new chain.

The recoverable ranges are presented to users as a timeline on the UI. Times covered in recoverable ranges appear in green and time ranges which are not part of any chain appear in red. This allows users to see at a glance to which time ranges their database can be recovered. They can use a slider to select any time that appears in green and perform an automated recovery to it. Embodiments determine the database and log snapshots needed for recovery and generate scripts to perform automated recovery. Times that appear in red cannot be selected for recovery on the UI.

FIG. 1 depicts one embodiment of a networked computing environment 100 in which the disclosed technology may be practiced. As depicted, the networked computing environment 100 includes a datacenter 150, a database backup system 170, and a computing device 154 in communication with each other via one or more networks 180. The networked computing environment 100 may include a plurality of computing devices interconnected through the one or more networks 180. The one or more networks 180 may allow computing devices and/or storage devices to connect to and communicate with other computing devices and/or other storage devices. In some cases, the networked computing environment 100 may include other computing devices and/or other storage devices not shown. The other computing devices may include, for example, a mobile computing device, a non-mobile computing device, a server, a work station, a laptop computer, a tablet computer, a desktop computer, or an information processing system. The other storage devices may include, for example, a storage area network storage device, a networked-attached storage device, a hard disk drive, a solid-state drive, or a data storage system.

The datacenter 150 may include one or more servers in communication with one or more storage devices. The datacenter stores at least one database. The system 170 may include a data management system for backing up the database stored in the datacenter 150.

The storage device(s), if any, may include one or more hardware storage devices for storing data, such as a hard disk drive (HDD), a magnetic tape drive, a solid-state drive (SSD), a storage area network (SAN) storage device, or a networked attached storage (NAS) device. In some cases, a datacenter, such as datacenter 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

One embodiment of system 170 includes a network interface, processor, memory, and disk all in communication with each other. Network interface allows system 170 to connect to one or more networks 180. Network interface may include a wireless network interface and/or a wired network interface. Processor allows the system 170 to execute computer-readable instructions stored in memory in order to perform processes described herein. The processor may include one or more processing units, such as one or more CPUs and/or one or more GPUs. The memory may comprise one or more types of memory (e.g., RAM, SRAM, DRAM, ROM, EEPROM, NOR Flash, NAND Flash, etc.). The disk may include a hard disk drive and/or a solid-state drive. The memory and the disk may comprise hardware storage devices.

In one embodiment, the system 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point-in-tune versions of thousands of virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 154.

In some cases, networked computing environment 100 may provide remote access to secure applications and files stored within datacenter 150 from a remote computing device, such as computing device 154. The datacenter 150 may use an access control application to manage remote access to protected resources, such as protected applications, databases, or files located within the datacenter 150. To facilitate remote access to secure applications and files, a secure network connection may be established using a virtual private network (VPN). A VPN connection may allow a remote computing device, such as computing device 154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the system 170 may manage the extraction and storage of database snapshots associated with different point-in-time versions of one or more databases running within the datacenter 150. A snapshot of a database may correspond with a state of the database at a particular point in time. In response to a restore command from the computing device 154, the system 170 may restore a point-in-time version of a database or restore point-in-time versions of one or more files located on the database and transmit the restored data to a server (e.g., a server in the datacenter 150 or elsewhere). To improve storage density, the system 170 may deduplicate and compress data associated with different versions of a database and/or deduplicate and compress data associated with different databases. To improve system performance, the system 170 may first store database snapshots in a cache, such as a flash-based cache. The cache may also store popular data or frequently accessed data (e.g., based on a history of database restorations, incremental files associated with commonly restored database versions) and current day incremental files or incremental files corresponding with snapshots captured within the past 24 hours.

An incremental file may comprise a forward incremental file (also referred to as a log) or a reverse incremental file. A forward incremental file may include a set of data representing changes that have occurred since an earlier point-in-time snapshot of a database. To generate a snapshot of the database corresponding with a forward incremental file, the forward incremental file may be combined with an earlier point-in-time snapshot of the database (e.g., the forward incremental file may be combined with the last full image of the database that was captured before the forward incremental file was captured and any other forward incremental files that were captured subsequent to the last full image and prior to the forward incremental file). A reverse incremental file may include a set of data representing changes from a later point-in-time snapshot of a database. To generate a snapshot of the database corresponding with a reverse incremental file, the reverse incremental file may be combined with a later point-in-time snapshot of the database (e.g., the reverse incremental file may be combined with the most recent snapshot of the virtual machine and any other reverse incremental files that were captured prior to the most recent snapshot and subsequent to the reverse incremental file).

The system 170 may provide a user interface (e.g., a web-based interface or a GUI) that displays database backup information such as identifications of the databases protected and the historical versions or time machine views for each of the databases protected. A time machine view of a database may include snapshots of the database over a plurality of points in time. Each snapshot may comprise the state of the database at a particular point in time. Each snapshot may correspond with a different version of the database (e.g., Version 1 of a database may correspond with the state of the database at a first point in time and Version 2 of the database may correspond with the state of the database at a second point in time subsequent to the first point in time).

The user interface may enable an end user of the system 170 (e.g., a system administrator) to select a particular version of a database to be restored or mounted. When a particular version of a database has been mounted, the particular version may be accessed by a client (e.g., a virtual machine, a physical machine, or a computing device), e.g., the computing device 154, as if the particular version was local to the client. In one example, the system 170 may run a Network File System (NFS) server and make the particular version (or a copy of the particular version) of the database accessible for reading and/or writing. A user (e.g., database administrator) of the system 170 may then select the particular version to be mounted and run an application (e.g., a data analytics application) using the mounted version of the database. In another example, the particular version may be mounted as an iSCSI target.

In an embodiment, the system 170 includes a database restore engine 172, database backups 174, database log backups 176, and a GUI 178. During operation of the environment 100, the database restore engine 172 creates and stores database backups 174 and database log backups 176. The engine 172 calls APIs and/or other software to make and retrieve backups from the datacenter 150. For example, in an embodiment, the engine 172 can use ORACLE Recovery Manager (RMAN) to generate backups of a database in the datacenter 150. The GUI 178 then generates an interface, such as interface 500 (FIG. 5) showing a timeline of availability and unavailability of backups to restore a database on the datacenter 150. The GUI 178 can be viewed on the system 170 and/or other devices via the network 180, such as on the computing device 154. The GUI 178 can receive commands to restore a database based on user input (e.g., mouse click) on the timeline indicated as available.

Figure 2:
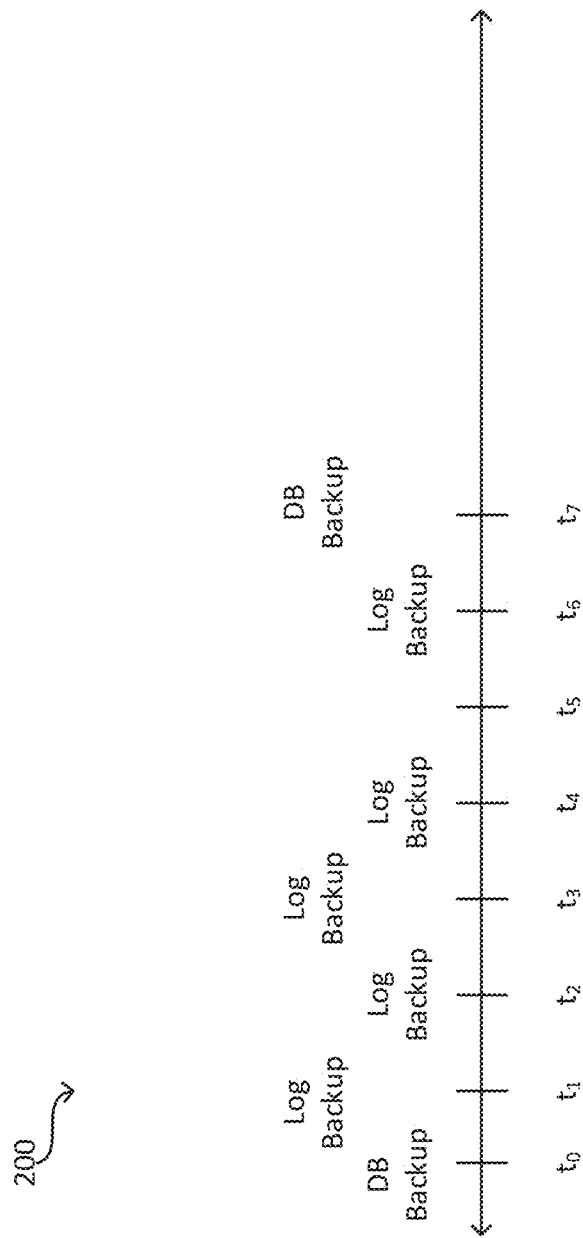
FIG. 2 depicts a timeline for database backups, according to some example embodiments.

FIG. 2 depicts a timeline 200 for database backups, according to some example embodiments. In the timeline 200, the engine 172 takes a full backup at t0 and log backups at t1-t4 and again at t6. There is no log backup at t5 (e.g., the log backup was skipped or deleted, corrupted, etc.). Accordingly, a recoverable chain (database restoration availability) exists from t0 through t4. The database is not recoverable (database restoration unavailable) at t5 or t6 as the chain is broken. The engine 172 takes a full backup at t7, which will start a new chain with restoration availability resuming at t7 and onwards if consecutive log backups are also available. The GUI 178 can illustrate this availability in the interface 500 via different colors, shading, text, and/or other indicators.

Figure 3:
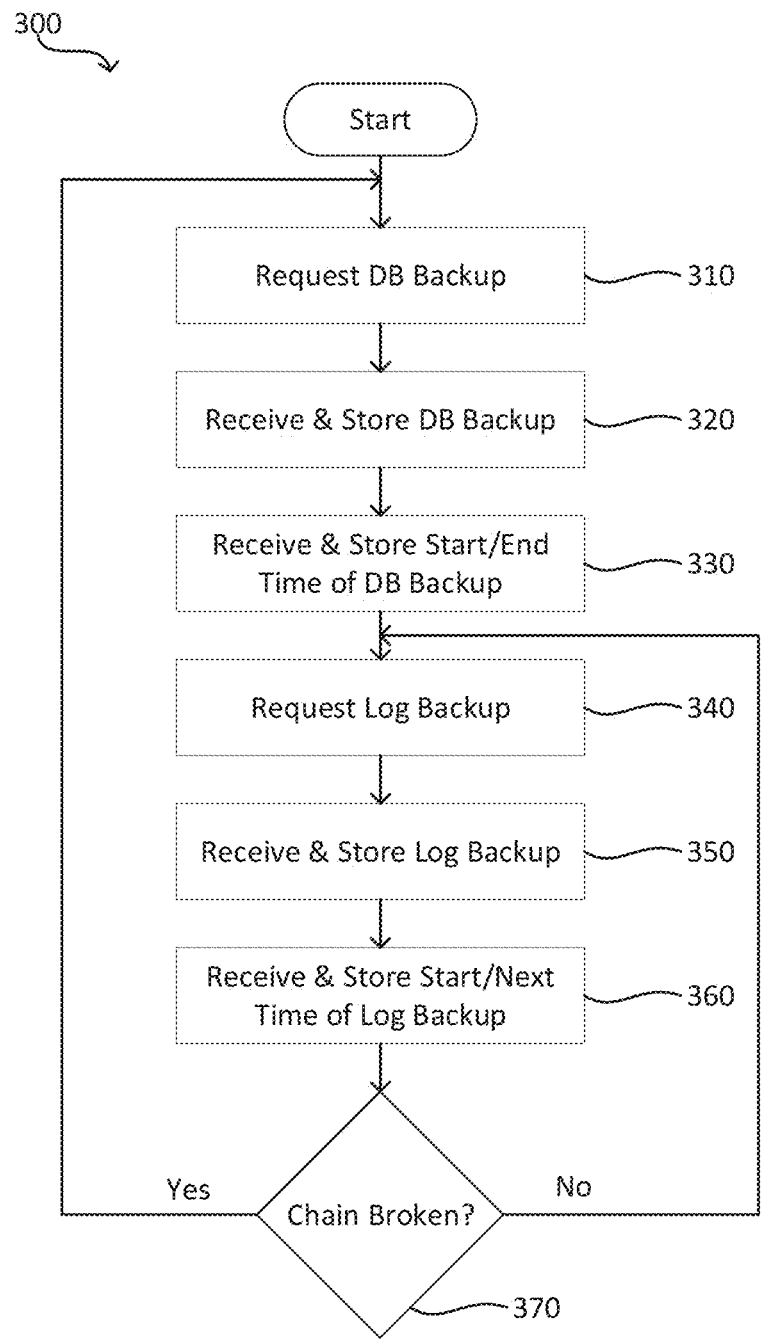
FIG. 3 depicts a flowchart illustrating a method of backing up a database, according to some example embodiments.

FIG. 3 depicts a flowchart illustrating a method 300 of backing up a database according to some example embodiments. Initially (e.g., at t0), the engine 172 requests (310) a database backup, which it then receives and stores (320) in database backups 174. The engine 172 also receives and stores (330) Start/End Time of the database backup. Later (e.g., t1), the engine 172 requests (340) a log backup, which is then received and stored (350) in the DB log backups 176. The engine 172 can request the DB and DB log backups via ORACLE RMAN and/or other software or APIs. The engine 172 also receives and stores (360) a Start/Next Time of the Log Backup and a sequence number. The engine 172 then determines (370) if a chain is broken. That is, if there is a break in sequence numbers between stored log backups. If there is no break, then the engine 172 returns to requesting (340). Otherwise, the engine 172 can optionally return to requesting (340) and await a user request or scheduled request to take a full database backup or return to requesting 310 to take a database backup so as to start a new chain and ensure availability of database restoration.

Figure 4:
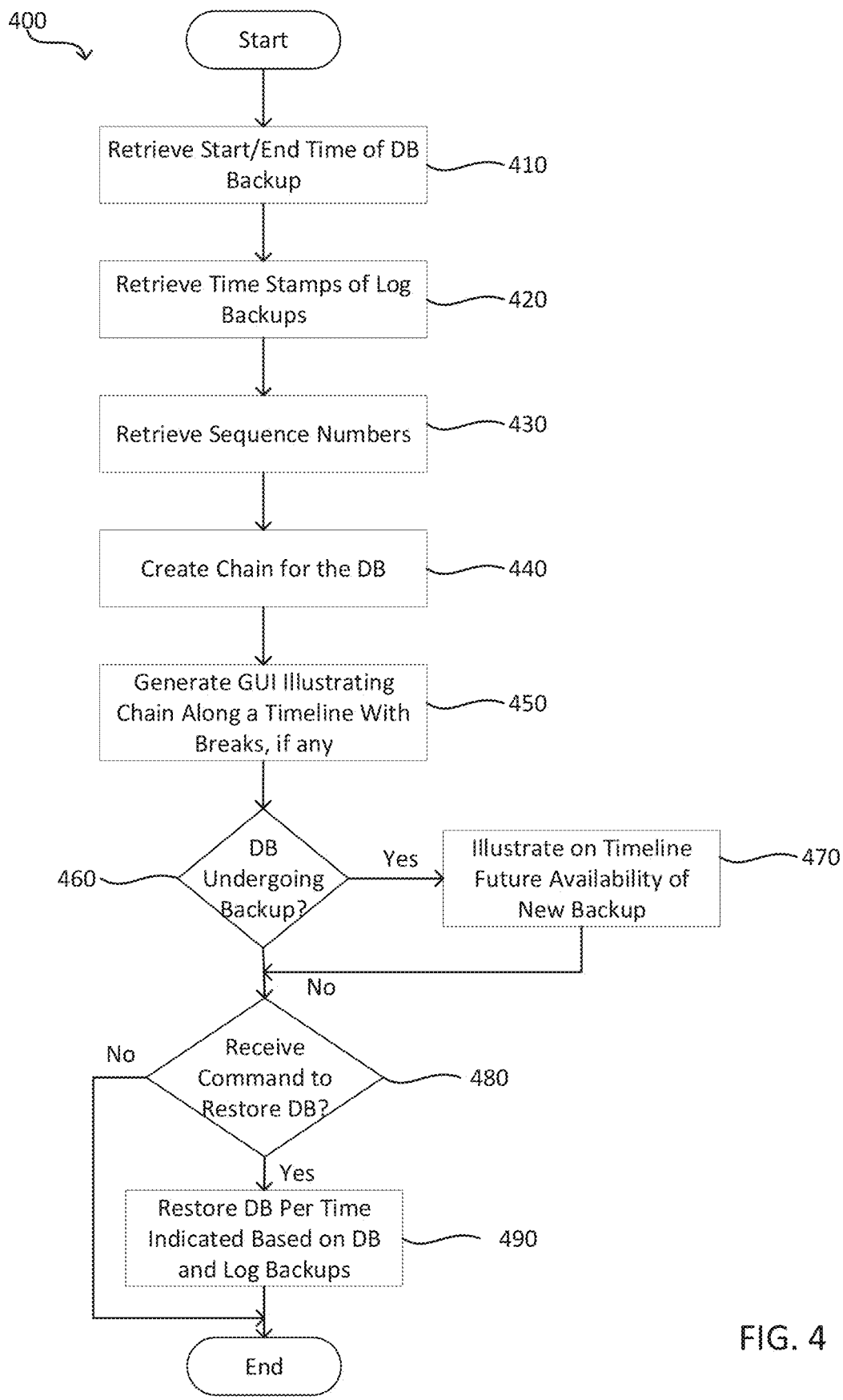
FIG. 4 depicts a flowchart illustrating a method of restoring a backed-up database, according to some example embodiments.

FIG. 4 depicts a flowchart illustrating a method 400 of restoring a backed-up database, according to some example embodiments. The engine 172 retrieves (410) a start/end time of a database backup; retrieves (420) time stamps of log backups; and retrieves (430) sequence numbers of the log backups. The engine 172 then creates (440) a chain that the GUI 178 illustrates (450) along a timeline with breaks, if any. Breaks are determined by non-consecutive numbers in the retrieved sequence numbers. If there is a break, then the engine 172 can automatically start a new database backup so that the database is recoverable again after the break without having to wait for a regular backup process to start. The timeline is generated using the Start/End time of the database backup and the start/next time of the log backups.

If the database is currently undergoing (460) backup, the GUI 178 can also indicate this on the timeline (470) in a different manner than availability or unavailability. For example, available restoration timepoints can be indicated in green with unavailable in red. Pending availability (e.g., during a new DB backup) can be indicated in orange and change to green once the backup is complete. Further, progress in the backup can be indicated, e.g., via percentage backup complete. The GUI 178 can also determine and list the cause of unavailability along the timeline at unavailable points (e.g., missing log file indicated by non-consecutive sequence number in the log backups or corrupted log indicated by a failed checksum or other mechanism).

If a restore command is received (480), e.g., via user input to a restoration point along the timeline indicated as available, the database is restored (490) to that point in time by combining the database backup and log backups that indicate transactions in the database since the database backup to the restoration point in time selected. The method 400 then ends. If a restore command is not received (480), the method 400 ends.

Figure 5:
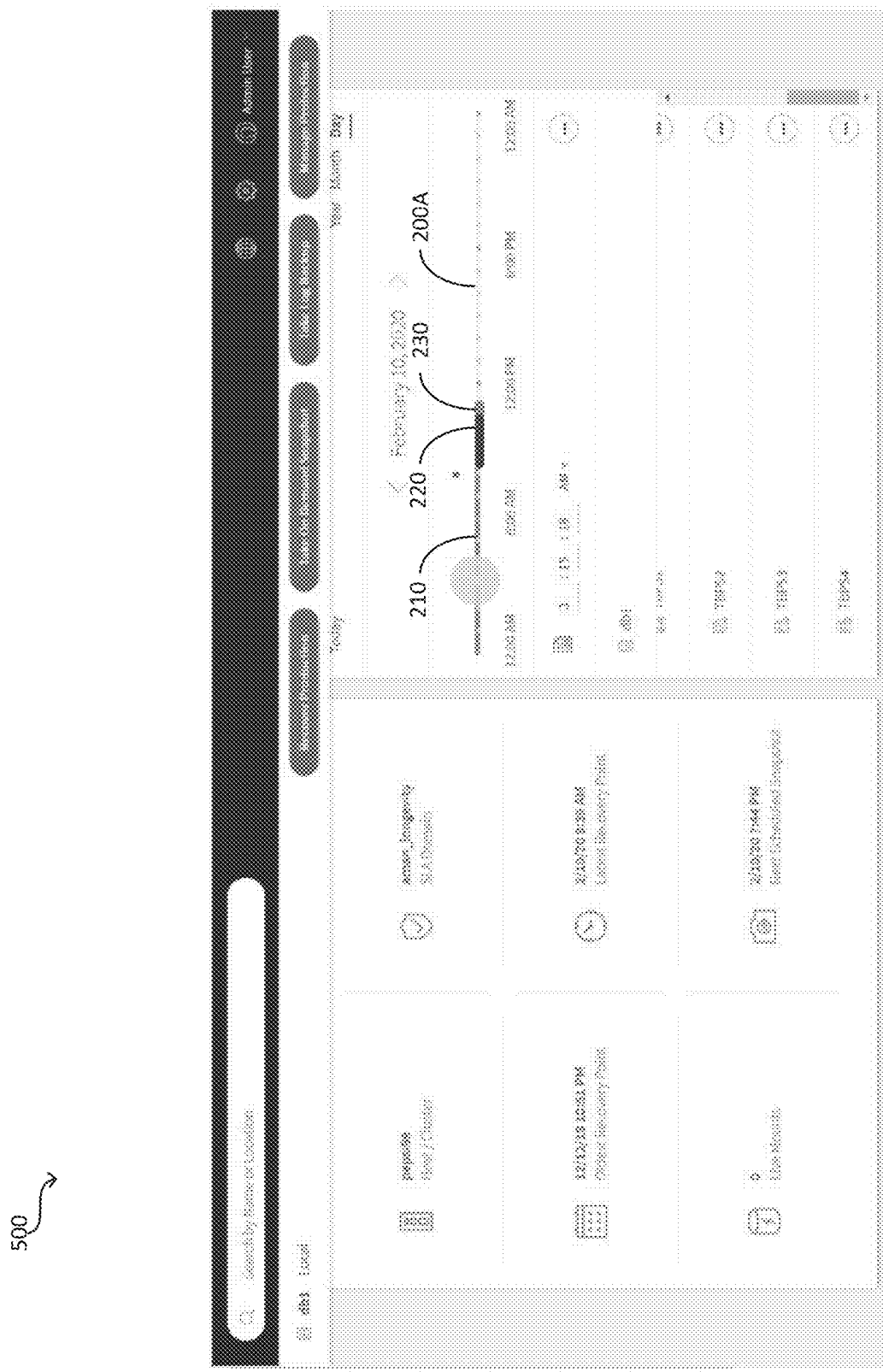
FIG. 5 depicts a graphical user interface, according to some example embodiments.

FIG. 5 depicts a GUI 500, according to some example embodiments. A timeline 200A indicates restoration availability and unavailability per the method 400. A first range 210 in a first color (e.g., blue or green) indicates availability, a second range 220 in a second color (e.g., red) indicates unavailability, and a third range 230 in a third color (e.g., orange) indicates pending availability (e.g., DB backup in progress). The interface also enables user to input commands including take an on demand snapshot (DB backup) and take a log backup instead of waiting for a scheduled log backup or DB backup.

Figure 6:
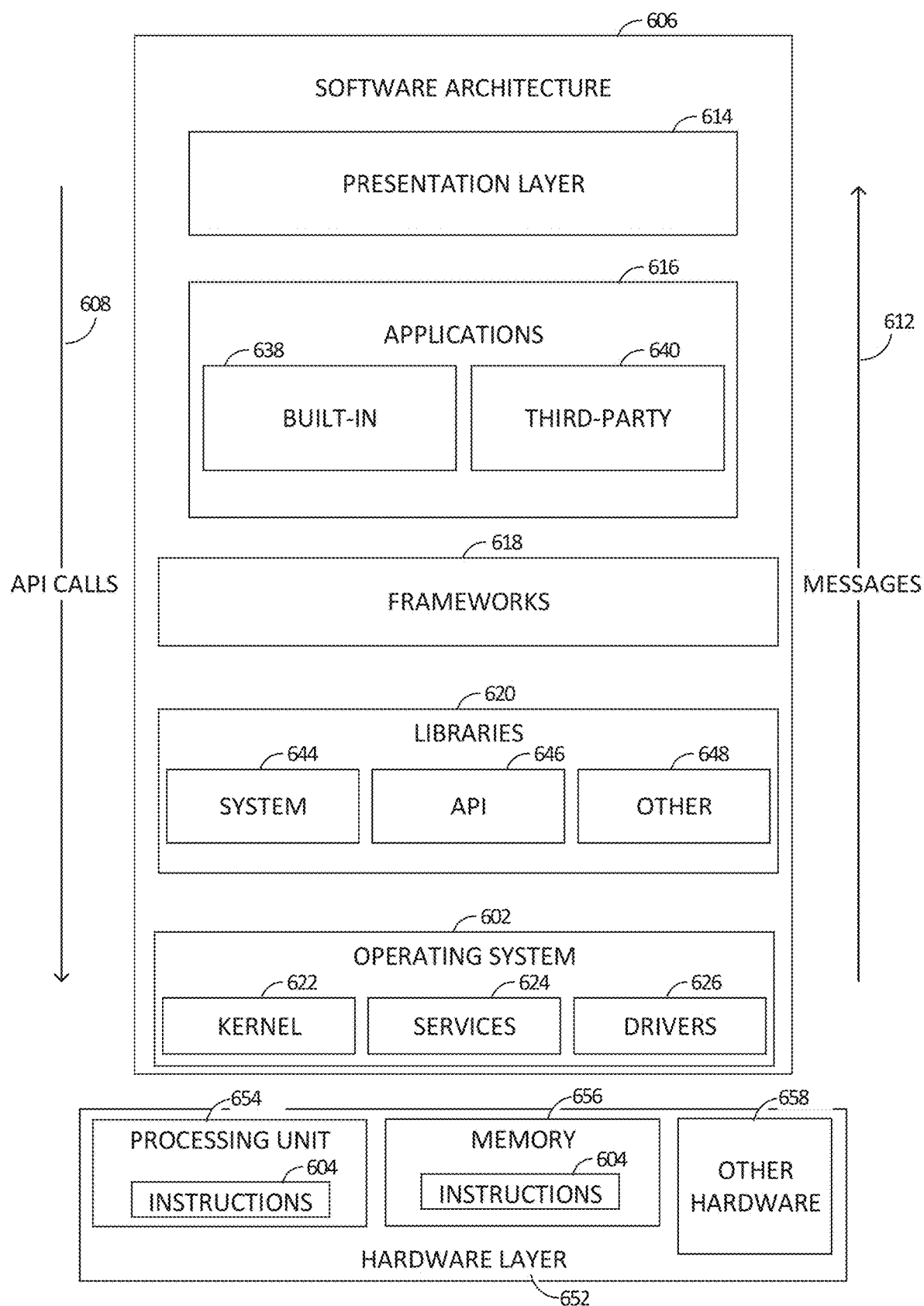
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture, and it will be appreciated that many other architectures may be implemented to facilitate the functionality described herein. The software architecture 606 may execute on hardware such as a machine 700 of FIG. 7 that includes, among other things, processors, memory, and I/O components. A representative hardware layer 652 is illustrated and can represent, for example, the machine 700 of FIG. 7. The representative hardware layer 652 includes a processing unit 654 having associated executable instructions 604. The executable instructions 604 represent the executable instructions of the software architecture 606, including implementation of the methods, components, and so forth described herein. The hardware layer 652 also includes a memory/storage 656, which also has the executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke API calls 608 through the software stack and receive a response in the form of messages 612. The layers illustrated are representative in nature and not all software architectures have all layers. For example, some mobile or special-purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than by interfacing directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 provide a higher-level common infrastructure that may be used by the applications 616 and/or other software components/modules. For example, the frameworks/middleware 618 may provide various GUI functions, high-level resource management, high-level location services, and so forth. The frameworks/middleware 618 may provide a broad spectrum of other APIs that may be utilized by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. The third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as the operating system 602) to facilitate functionality described herein.

The applications 616 may use built-in operating system functions (e.g., kernel 622, services 624, and/or drivers 626), libraries 620, and frameworks/middleware 618 to create user interfaces to interact with users of the system. Alternatively, or additionally, in some systems, interactions with a user may occur through a presentation layer, such as the presentation layer 614. In these systems, the application/component "logic" can be separated from the aspects of the application/component that interact with a user.

Figure 7:
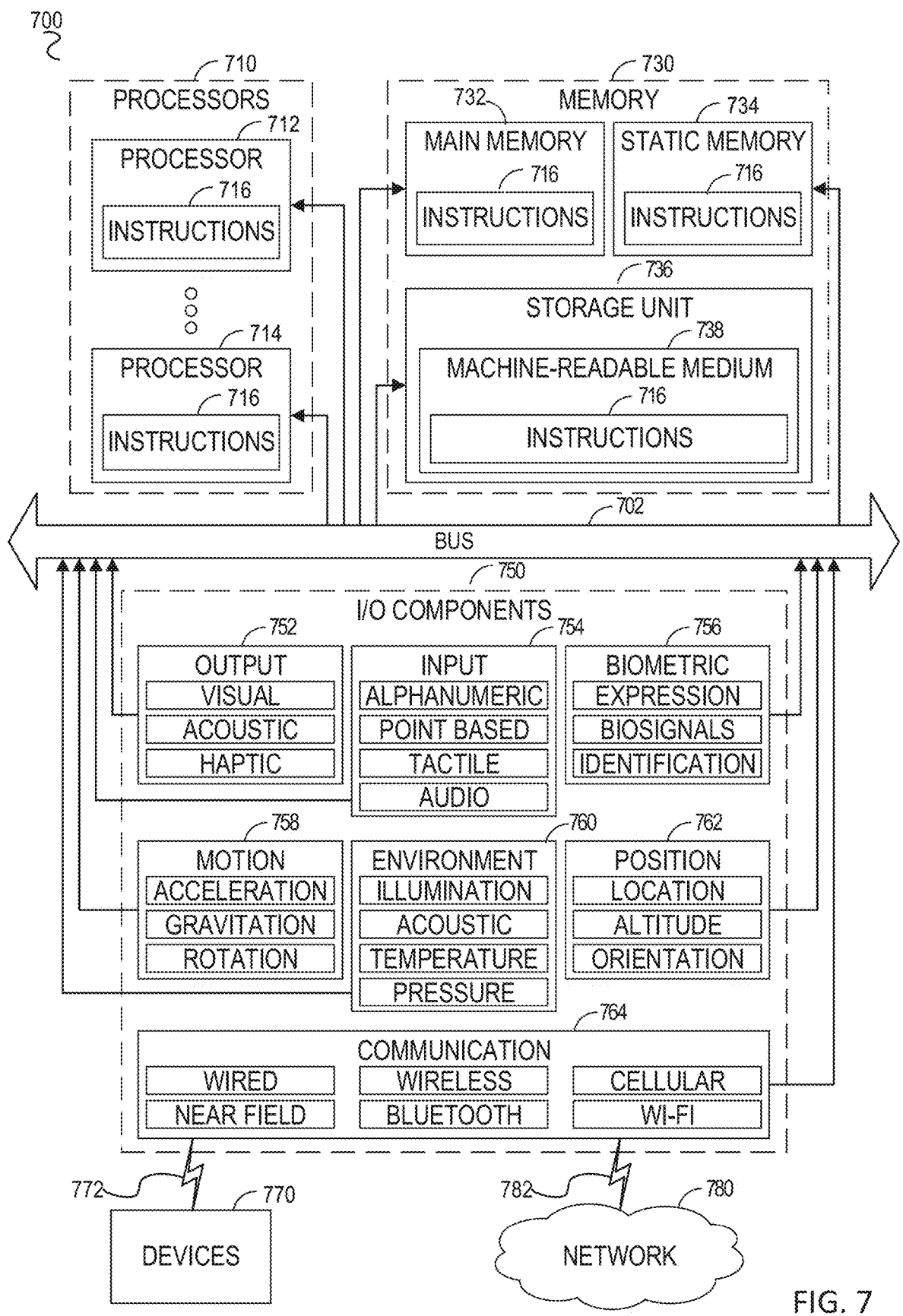
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. As such, the instructions 716 may be used to implement modules or components described herein. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines that individually or jointly execute the instructions 716 to perform any one or more of the methodologies discussed herein.

The machine 700 may include processors 710, memory/storage 730, and I/O components 750, which may be configured to communicate with each other such as via a bus 702. The memory/storage 730 may include a main memory 732, static memory 734, and a storage unit 736, both accessible to the processors 710 such as via the bus 702. The storage unit 736 and main memory 732 store the instructions 716 embodying any one or more of the methodologies or functions described herein. The instructions 716 may also reside, completely or partially, within the static memory 734, within the storage unit 736 (e.g., on machine readable-medium 738), within at least one of the processors 710 (e.g., within the processor cache memory accessible to processors 712 or 714), or any suitable combination thereof, during execution thereof by the machine 700. Accordingly, the main memory 732, static memory 734, the storage unit 736, and the memory of the processors 710 are examples of machine-readable media.

The I/O components 750 may include a wide variety of components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environment components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environment components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), or other components that may provide indications, measurements, or signals corresponding to a surrounding physical environment. The position components 762 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or other suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

"CARRIER SIGNAL" in this context refers to any intangible medium that is capable of storing, encoding, or carrying instructions 716 for execution by the machine 700, and includes digital or analog communications signals or other intangible media to facilitate communication of such instructions 716. Instructions 716 may be transmitted or received over the network 780 using a transmission medium via a network interface device and using any one of a number of well-known transfer protocols.

"CLIENT DEVICE" in this context refers to any machine 700 that interfaces to a network 780 to obtain resources from one or more server systems or other client devices. A client device may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 780.

"COMMUNICATIONS NETWORK" in this context refers to one or more portions of a network 780 that may be an ad hoc network, an intranet, an extranet, a VPN, a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 780 may include a wireless or cellular network and the coupling 782 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, a device, or other tangible media able to store instructions 716 and data temporarily or permanently and may include, but is not limited to, RAM, ROM, buffer memory, flash memory, optical media, magnetic media, cache memory, other types of storage (e.g., EPROM), and/or any suitable combination thereof. The term "machine-readable medium" should be taken to include a single medium or multiple media (e.g., a centralized or distributed database, or associated caches and servers) able to store instructions 716. The term "machine-readable medium" shall also be taken to include any medium, or combination of multiple media, that is capable of storing instructions 716 (e.g., code) for execution by a machine 700, such that the instructions 716, when executed by one or more processors 710 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 712 or a group of processors 710) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 700) uniquely tailored to perform the configured functions and are no longer general-purpose processors 710.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 712 configured by software to become a special-purpose processor, the general-purpose processor 712 may be configured as respectively different special-purpose processors (e.g., comprising different hardware components) at different times. Software accordingly configures a particular processor 712 or processors 710, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 710 that are temporarily configured (e.g., by software) or permanently configured to perform the relevant operations. Whether temporarily or permanently configured, such processors 710 may constitute processor-implemented components that operate to perform one or more operations or functions described herein. As used herein, "processor-implemented component" refers to a hardware component implemented using one or more processors 710. Similarly, the methods described herein may be at least partially processor-implemented, with a particular processor 712 or processors 710 being an example of hardware. For example, at least some of the operations of a method may be performed by one or more processors 710 or processor-implemented components. Moreover, the one or more processors 710 may also operate to support performance of the relevant operations in a "cloud computing" environment or as a "software as a service" (SaaS). For example, at least some of the operations may be performed by a group of computers (as examples of machines 700 including processors 710), with these operations being accessible via a network 780 (e.g., the Internet) and via one or more appropriate interfaces (e.g., an API). The performance of certain of the operations may be distributed among the processors 710, not only residing within a single machine 700, but deployed across a number of machines 700. In some example embodiments, the processors 710 or processor-implemented components may be located in a single geographic location (e.g., within a home environment, an office environment, or a server farm). In other example embodiments, the processors 710 or processor-implemented components may be distributed across a number of geographic locations.

"PROCESSOR" in this context refers to any circuit or virtual circuit (a physical circuit emulated by logic executing on an actual processor 712) that manipulates data values according to control signals (e.g., "commands," "op codes," "machine code," etc.) and which produces corresponding output signals that are applied to operate a machine 700. A processor may, for example, be a CPU, a reduced instruction set computing (RISC) processor, a complex instruction set computing (CISC) processor, a GPU, a digital signal processor (DSP), an ASIC, a radio-frequency integrated circuit (RFIC), or any combination thereof. A processor 710 may further be a multi-core processor 710 having two or more independent processors 712, 714 (sometimes referred to as "cores") that may execute instructions 716 contemporaneously.

"TIMESTAMP" in this context refers to a sequence of characters or encoded information identifying when a certain event occurred, for example giving date and time of day, sometimes accurate to a small fraction of a second.

The following examples describe various embodiments of methods, machine-readable media, and systems (e.g., machines, devices, or other apparatus) discussed herein.

1. A data management system, comprising:
one or more processors in communication with a database, the one or more processors configured to perform operations including:
  retrieve start and end times of a backup of the database;
  retrieve time stamps of log backups of the database;
  retrieve sequence numbers of the log backups;
  generate a graphical user interface illustrating a timeline of availability of database restoration and unavailability;
  make a second backup of the database;
  illustrate, on the graphical user interface during the making, pending availability of the second database backup;
  receive a command to restore the database at an available time as illustrated by the graphical user interface; and
  restore the database.

2. The system of example 1, wherein the unavailability starting at a time indicated by a time stamp of a first log backup having a non-consecutive sequence number.

3. The system of any of the preceding examples, wherein the operations further include determining a cause of the unavailability and displaying the determined cause on the interface.

4. The system of any of the preceding examples, wherein the making a second backup of the database is in response to determining there is a non-consecutive retrieved sequence number.

5. The system of example 4, wherein the operations further include
receive a log backup having a sequence number preceding the non-consecutive number; and
update the graphical user interface to indicate availability based on the received log backup.

6. The system of any of the preceding examples, wherein the operations further comprise receiving a log file with a sequence number that restores consecutiveness to the retrieved sequence numbers and updating the graphical user interface to illustrate availability based on the received log file.

7. A computer-implemented method at a data management system, the method comprising:
retrieving start and end times of a backup of a database;
retrieving time stamps of log backups of the database;
retrieving sequence numbers of the log backups;
generating a graphical user interface illustrating a timeline of availability of database restoration and unavailability;
making a second backup of the database;
illustrating, on the graphical user interface during the making, pending availability of the second database backup;
receiving a command to restore the database at an available time as illustrated by the graphical user interface; and
restoring the database.

8. The method of any of the preceding examples, further comprising illustrating the timeline with different colors to indicate availability, unavailability, and pending availability.

9. The method of any of the preceding examples, further comprising determining a cause of the unavailability and displaying the determined cause on the interface.

10. The method of any of the preceding examples, wherein the making a second backup of the database is in response to determining there are non-consecutive retrieved sequence numbers.

11. The method of example 10, further comprising making additional log backups after the making the second database backup.

12. The method of any of the preceding examples, further comprising receiving a log file with a sequence number that restores consecutiveness to the retrieved sequence numbers and updating the graphical user interface to illustrate availability based on the received log file.

13. A non-transitory, machine-readable medium storing instructions which, when read by a data management system, cause the data management system to perform operations comprising, at least:
retrieving start and end times of a backup of a database;
retrieving time stamps of log backups of the database;
retrieving sequence numbers of the log backups;
generating a graphical user interface illustrating a timeline of availability of database restoration and unavailability;
making a second backup of the database;
illustrating, on the graphical user interface during the making, pending availability of the second database backup;
receiving a command to restore the database at an available time as illustrated by the graphical user interface; and
restoring the database.

14. The medium of any of the preceding examples, wherein the operations further comprise illustrating the timeline with different colors to indicate availability, unavailability, and pending availability.

15. The medium of any of the preceding examples, wherein the operations further comprise determining a cause of the unavailability and displaying the determined cause on the interface.

16. The medium of any of the preceding examples, wherein the making a second backup of the database is in response to determining there are non-consecutive retrieved sequence numbers.

17. The medium of example 16, wherein the operations further comprise receiving a log backup having a sequence number preceding the non-consecutive number; and
updating the graphical user interface to indicate availability based on the received log backup.

18. The medium of example 16 or 17, wherein the operations further comprise making additional log backups after the making the second database backup.

19. The medium of any of the preceding examples, wherein the operations further comprise receiving a log file with a sequence number that restores consecutiveness to the retrieved sequence numbers and updating the graphical user interface to illustrate availability based on the received log file.

20. The medium of any of the preceding examples, wherein the unavailability starting at a time indicated by a time stamp of a first log backup having a non-consecutive sequence number.

What is claimed is:

1. A system, comprising:
one or more processors in communication with a database, the one or more processors configured to perform operations including:
retrieving start and end times of a backup of the database;
retrieving time stamps of log backups of the database;
retrieving sequence numbers of the log backups;
generating a graphical user interface illustrating a timeline of backup availability and unavailability based on the sequence numbers retrieved from the log backups of the database, wherein consecutive sequence numbers indicate backup availability and non-consecutive sequence numbers indicate backup unavailability;
receiving a command to restore the database to an available time as illustrated by the graphical user interface; and
restoring the database to the available time in accordance with the command.

2. The system of claim 1, wherein the unavailability starts at a time indicated by a time stamp of a first log backup having a non-consecutive sequence number.

3. The system of claim 1, wherein the operations further include determining a cause of the backup unavailability and displaying the determined cause on the graphical user interface.

4. The system of claim 1, further comprising making a second backup of the database in response to determining there is a non-consecutive retrieved sequence number and illustrating, on the graphical user interface during the making, pending availability of the second backup.

5. The system of claim 4, wherein the operations further include:
receiving a log backup having a sequence number preceding a non-consecutive number; and
updating the graphical user interface to indicate availability based on the received log backup.

6. The system of claim 1, wherein the operations further comprise:
  receiving a log file with a sequence number that restores consecutiveness to the retrieved sequence numbers; and
  updating the graphical user interface to illustrate availability based on the received log file.

7. A method at a system, the method comprising:
  retrieving start and end times of a backup of a database;
  retrieving time stamps of log backups of the database;
  retrieving sequence numbers of the log backups;
  generating a graphical user interface illustrating a timeline of backup availability and unavailability based on the sequence numbers retrieved from the log backups of the database, wherein consecutive sequence numbers indicate backup availability and non-consecutive sequence numbers indicate backup unavailability;
  receiving a command to restore the database to an available time as illustrated by the graphical user interface; and
  restoring the database to the available time in accordance with the command.

8. The method of claim 7, further comprising illustrating the timeline with different colors to indicate availability, unavailability, and pending availability.

9. The method of claim 7, further comprising determining a cause of the cause of unavailability and displaying the determined cause on the graphical user interface.

10. The method of claim 7, further comprising making a second backup of the database in response to determining there are non-consecutive retrieved sequence numbers and illustrating, on the graphical user interface during the making, pending availability of the second backup.

11. The method of claim 10, further comprising making additional log backups after making the second backup.

12. The method of claim 7, further comprising receiving a log file with a sequence number that restores consecutiveness to the retrieved sequence numbers and updating the graphical user interface to illustrate availability based on the received log file.

13. A non-transitory machine-readable medium storing instructions which, when read by a system, cause the system to perform operations comprising, at least:
  retrieving start and end times of a backup of a database;
  retrieving time stamps of log backups of the database;
  retrieving sequence numbers of the log backups;
  generating a graphical user interface illustrating a timeline of backup availability and unavailability based on the sequence numbers retrieved from the lot backups of the database, wherein consecutive sequence numbers indicate backup availability and non-consecutive sequence numbers indicate backup unavailability;
  receiving a command to restore the database to an available time as illustrated by the graphical user interface; and
  restoring the database to the available time in accordance with the command.

14. The non-transitory machine-readable medium of claim 13, wherein the operations further comprise illustrating the timeline with different colors to indicate availability, unavailability, and pending availability.

15. The non-transitory machine-readable medium of claim 13, wherein the operations further comprise determining a cause of the backup unavailability and displaying the determined cause on the graphical user interface.

16. The non-transitory machine-readable medium of claim 13, wherein the operations further comprise making a second backup of the database is in response to determining there are non-consecutive retrieved sequence numbers and illustrating, on the graphical user interface during the making, pending availability of the second backup.

17. The non-transitory machine-readable medium of claim 16, wherein the operations further comprise:
  receiving a log backup having a sequence number preceding a non-consecutive number; and
  updating the graphical user interface to indicate availability based on the received log backup.

18. The non-transitory machine-readable medium of claim 16, wherein the operations further comprise making additional log backups after making the second backup.

19. The non-transitory machine-readable medium of claim 13, wherein the operations further comprise receiving a log file with a sequence number that restores consecutiveness to the retrieved sequence numbers and updating the graphical user interface to illustrate availability based on the received log file.

20. The non-transitory machine-readable medium of claim 13, wherein the unavailability starts at a time indicated by a time stamp of a first log backup having a non-consecutive sequence number.

* * * * *